United States Patent
Thomas

[11] Patent Number: 5,910,855
[45] Date of Patent: Jun. 8, 1999

[54] PASSIVE ACOUSTO-OPTIC MODULATOR

[75] Inventor: Andrew James Thomas, Gosport, United Kingdom

[73] Assignee: The Secretary of State for Defense in Her Britannic Majesty's Government of the United Kingdom of Great Britain and Northern Ireland, Hants, United Kingdom

[21] Appl. No.: 08/894,958

[22] PCT Filed: Feb. 29, 1996

[86] PCT No.: PCT/GB96/00450

§ 371 Date: Sep. 3, 1997

§ 102(e) Date: Sep. 3, 1997

[87] PCT Pub. No.: WO96/28001

PCT Pub. Date: Sep. 12, 1996

[30] Foreign Application Priority Data

Mar. 3, 1995 [GB] United Kingdom ............... 9504298

[51] Int. Cl.$^6$ ................. G02F 1/11; G02F 1/03; G02F 1/01; H04B 10/12
[52] U.S. Cl. ............. 359/285; 359/290; 359/151; 359/263; 359/279
[58] Field of Search ................. 359/285, 279, 359/263, 151, 141, 579, 290; 310/335

[56] References Cited

U.S. PATENT DOCUMENTS

| | | | |
|---|---|---|---|
| 4,283,114 | 8/1981 | Wandrack | 350/96.2 |
| 4,345,482 | 8/1982 | Adolfsson et al. | 73/862.59 |
| 4,373,781 | 2/1983 | Schlafer | 350/96.29 |
| 4,514,860 | 4/1985 | Adolfsson et al. | 455/612 |
| 4,926,696 | 5/1990 | Haritonidis et al. | 73/205 |
| 4,942,767 | 7/1990 | Haritonidis et al. | 73/705 |
| 5,052,228 | 10/1991 | Haritonidis | 73/705 |
| 5,247,490 | 9/1993 | Goepel et al. | 367/149 |

FOREIGN PATENT DOCUMENTS 2 508 754 of 0000 France.
2117993 of 0000 United Kingdom.

OTHER PUBLICATIONS

Ole Mar. 1996 p. 8.
Deport Telephonique Sur Fibre Optique, P. Lecoy, A. Malki, R.Gafsi, O. Alexaline, Y. Mevel; OPTP 1996.

*Primary Examiner*—Georgia Epps
*Assistant Examiner*—John Woolner
*Attorney, Agent, or Firm*—Nixon & Vanderhye P.C.

[57] ABSTRACT

A passive acousto-optic modulator for the modulation of a light beam as a function of a variation in air pressure comprising a beam splitter arranged relative to the beam so as to produce a signal beam and reference beam, the beam splitter ideally comprising a flat interface located between two optically transparent mediums such as the end of an optic fiber located within air, the interface being arranged relative to the light modulator such that when the light beam travels through the interface, some of the light beam is able to pass through the interface to form the signal beam, the rest of the light beam being reflected back off the interface to form the reflected reference beam; a light modulator which modulates the signal beam, the light modulator comprising an approximately flat optically reflective surface capable of movement, the reflective surface being located in a position which, at rest is a predetermined distance from the beam splitter and is approximately parallel to and facing the beam splitter and a piezoelectric element, the piezoelectric element being connected to the reflective surface in such a way that when an electric potential is applied across the piezoelectric element, it causes the reflective surface to move; and conversion means to convert variations in air pressure into corresponding variations in a signal for driving the light modulator; the arrangement being such that the modulated signal beam is combined with the reference beam to produce constructive or destructive interference.

18 Claims, 1 Drawing Sheet

PASSIVE ACOUSTO-OPTIC MODULATOR

BACKGROUND OF THE INVENTION

1. Field of the Invention

This invention relates to passive acousto-optic modulators for use, in particular, in microphones for divers.

2. Discussion of the Prior Art

Optical fibers are generally used for very large bandwidth, high data rate digital communication systems. However, optic fibers can also be used as analogue low bandwidth verbal communication systems for divers. One or two optic fibers are fed from the surface down to the diver. Light generated from a constant illumination source is passed down the fiber. The diver speaks into a microphone which modulates the light signal. The modulated light signal is then returned to the surface. The returned signal is then converted into an electrical signal, the signal then being amplified and demodulated, the resulting signal being used to generate the verbal message.

Existing designs of optical microphone comprise acousto-optic modulators which modulate an optical signal in accordance with an acoustic signal. To avoid any additional cabling, it is desirable that the microphones are able to operate without the need for a power supply.

Presently, acousto-optic modulators comprise a series of lenses and a reflective diaphragm. When two optical fibers are used, the acousto-optic modulator comprises an additional beam splitter. The light from the constant illumination source passes down an optical fiber and into the microphone. A convex lens on the end of the fiber focuses the light into a parallel beam. The light is then focused onto a reflective diaphragm by a second convex lens which then reflects the light back along the path it has just travelled. If a beam splitter is used, the incoming beam of light from the source is separated from the reflected light so that each can be sent via a different optical fiber. The position of the diaphragm at rest is fixed relative to the second lens. If the diaphragm is situated at the focal point of the lens, then the amount of light reflected back is equal to the intensity of the light at the focal point. As the diaphragm is moved from the focal point, the intensity of light reflected back is attenuated. Therefore, the light becomes modulated as a function of the movement of the diaphragm. The diaphragm is moved by the varying air pressures generated by the diver's speech.

However, there are several problems with this design of microphone. Firstly, the microphone is an "in air" microphone, capable of only operating in a dry environment. The design is vulnerable to water ingress, particularly when the diver is using it at depth where high pressures would be applied to the microphone. Droplets of water on the lenses cause distortions in the light signal and therefore lose of sensitivity. Total flooding of the microphone will cause the focal lengths of the lenses to change making the microphone very insensitive or not operable at all.

Secondly, each of the air/glass interfaces of the lenses act as an attenuator to the light signal, loosing around 3dBs per interface. This leads to insensitivity of the microphone and noisy return signals.

U.S. Pat. Nos. 4,926,696, 4,942,767 and 5,052,228 disclose three different devices which modulate a light signal but operate on the same principle to each other. The devices comprise a diaphragm which is located so that it faces a beam splitter. A light signal passes through the beam splitter and is separated into two light signals. One or the light signals proceeds to the diaphragm where it is reflected back. The reflected light signal then constructively or destructively interferes with the other signal to create a modulated light signal. The amount of constructive or destructive interference is dependent on the distance between the diaphragm and the beam splitter. Therefore, the amount of modulation of the light signal is dependent on the movement of the diaphragm. The diaphragm movement is dependent on pressure applied to the reverse side of the diaphragm. In U.S. Pat. Nos. 4,942,767 and 5,052,228 the beam splitter is formed by the end of an optic fiber.

U.S. Pat. No. 5,247,490 discloses an acoustic optical sensor which operates on the same principles as the devices disclosed in U.S. Pat. Nos. 4,926,696, 4,942,767 and 5,052,228. However the device has been pressure compensated for operation in high pressure environments such as the deep sea. The document Deport Telephonique Sur Fiber Optique by Ecole Centrals De Paris discloses a microphone which converts sound vibrations into an modulated optical signal using the same technique.

UK Patent Application GB 2,117,993 discloses an acoustic optical modulator which comprises a piezo electric hydrophone to convent acoustic vibrations into an electrical signal, the electrical signal then being used to drive a liquid crystal modulator which modulates a light signal as a function of the acoustic vibrations.

U.S. Pat. No. 4,514,860 discloses a sensor system for measuring primarily electric voltages or magnetic fields and comprises an optical fiber which is arranged so that the end faces a luminescent layer, a number of optical filters and two electrodes which generate within the luminescent layer a lateral electric field for the purpose accelerating charge carriers in the layer which are excited by light shone onto the luminescent layer via the fiber optic.

SUMMARY OF THE INVENTION

The object of the present invention is to produce a passive acousto-optic coupler microphone hybrid to overcome the above problems.

Accordingly, there is provided a passive acousto-optic modulator for the modulation of a light beam as a function of a variation in air pressure comprising a beam splitter arranged relative to the beam so as to produce a signal beam and a reference beam;

a light modulator which modulates the signal beam, the light modulator comprising an approximately flat optically reflective surface capable of movement, the reflective surface being located in a position which, at rest, is a predetermined distance from the beam splitter and a piezo electric element, the piezo electric element being connected to the reflective surface in such a way that when an electric potential is applied across the piezo electric element, it causes the reflective surface to move; and conversion means to convert variations in air pressure into corresponding variations in a signal for driving the light modulator;

the arrangement being such that the modulated signal beam is recombined with the reference beam to produce constructive or destructive interference.

Preferably the beam splitter transmits the signal beam and reflects the reference beam. Ideally, the beam splitter is used to recombine the modulated signal beam and the reference beam.

The beam splitter could comprise a flat interface located between two optically transparent media, the interface being arranged relative to the light modulator such that when the light beam travels through the interface, part of the light beam is able to pass through the interface to form the signal beam, the rest of the light beam is reflected back off the interface to form the reference beam, the modulated signal beam could also pass back through the interface, constructively or destructively interfering with the reference beam at the interface.

In such a realisation, the light beam would ideally travel through the interface in a direction which is perpendicular to the interface so that the direction of the signal beam and reference beam are perpendicular to the interface. Preferably, the modulated signal beam passes through the interface in a direction which is also perpendicular to the interface.

In a particular arrangement, the acousto-optic modulator as described in the present invention operates by constructive and destructive interference of a light beam passed down an optical fiber. The interface of the present invention can be formed by the end of an optical fiber located within a gaseous or liquid medium, the two medias being first the material from which the optical fiber has been formed and second the surrounding gas or liquid. Preferably, a surrounding gas in the form of air is used. When the light beam reaches the end of the fiber, part of it is reflected back internally by the end of fiber to form the reference beam, the rest being transmitted through the end of the fiber and leaves the fiber towards the light modulator forming the signal beam. This signal beam is modulated by the light modulator relative to the reference beam. The signal beam is preferably phase modulated. The modulated signal beam which is returned from the light modulator passes back through the beam splitter adding or subtracting to the reference beam thus causing constructive or destructive interference.

The light modulator and the conversion means can be located remotely from each other with additional means being provided to enable the signal generated by the conversion means to be transmitted to the light modulator. It is not necessary for the light modulator and the conversion means to be connected together or located within close proximity to each other for the present invention to work. It is also not necessary for the position of the conversion means to be fixed relative to the light modulator.

One practical type of signal which can be generated by the conversion means to drive the optical modulator is an electrical signal. If so, the additional means for transmitting the signal between the conversion means and the light modulator comprises electrical wires.

Ideally, the light beam is a monochromatic light beam.

Ideally, movement of the reflective surface is linear and in a direction approximately perpendicular to the beam splitter, it modulates the phase of the signal beam. The amount of movement should be a function of the signal generated by the conversion means so that the resultant phase modulation of the reflected light is a function of the variation in the signal.

After the modulated light is transmitted through the beam splitter, it recombines with the reference beam. Then, assuming a coherent wavefront, the phase of the modulated reflected light beam relative to the internally reflected reference beam is dependent on the extra distance that it has travelled, namely the distance travelled by the light between the beam splitter and the light modulator and back. If the phase difference of the reference beam and the modulated signal beam are in 0° then they will add together (constructive interference). If the phase difference between the two beams is 180°, then they will subtract from each other (destructive interference). An the phase difference varies, so the relative amounts of constructive and destructive interference will vary.

The phase modulation of a signal is a function of the distance the light has to travel and consequently proportional to the amount of movement of the reflective surface. Ideally, the relative movement is restricted to less than one wavelength of the illumination source. Thus, by making the movement of the reflective surface a function of the variations in the air pressure, the mdulations of the light signal will became a function of the variations in air pressure.

Alternatively, the movement of the reflective surface could be rotational. As the reflective surface rotates, the direction in which the reflected light is sent is altered, thereby changing the path length and phase of the light reflected back towards the beam splitter. Therefore, (by making the amount of light reflected back a function of the angle of the reflective surface relative to the beam splitter) the amount of modulation of the light becomes a function of the angle of the reflective surface.

The piezo electric element within the light modulator could comprise piezo electric material attached to a metal disk which is securely mounted around its rim, the reflective surface being attached to the metal disk thereby being connected to the piezo electric element. When an electrical potential difference is applied across the piezo electric material, the piezo electric material would cause the disk to deform or flex which results in the movement of the reflective surface.

One type of piezo electric element which can be used for either purpose is a piezo-ceramic transducer.

Preferably, the light emitted from the interface is a narrowly divergent light beam to produce an approximately parallel beam of light. Ideally, it is a parallel beam of light.

BRIEF DESCRIPTION OF THE DRAWINGS

The invention will now be described by way of examples with reference to the following drawing of which.

DETAILED DESCRIPTION OF PREFERRED EMBODIMENTS

Figure 1:
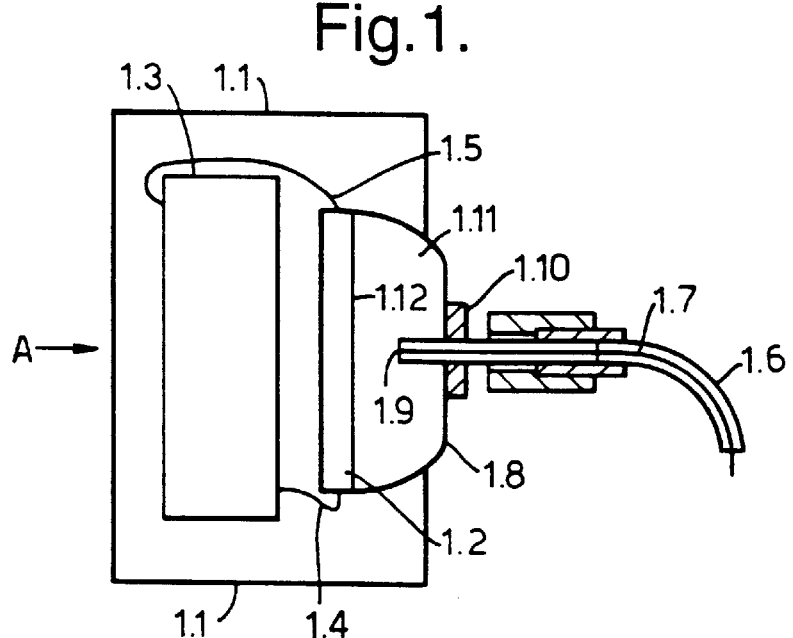
FIG. 1 shows one example of a design for an acousto-optic modulator.

FIG. 1 shows a cross sectional view of a design of an acousto-optic modulator, 1.1. It comprises two piezo electric elements, 1.2, 1.3, which are connected together using electrical wires, 1.4, 1.5. A fiber optic cable, 1.6, containing an optical fiber, 1.7, is connected to one of the piezo electric elements, 1.2, via metal casing, 1.8. The end of the fiber, 1.9, is held rigid relative to one of the piezo electric elements, 1.2, by a connector, 1.10. The end of the fiber, 1.9, is located within air, 1.11 and forms the interface. The first piezo electric element, 1.2, has a reflective surface, 1.12, connected to it to reflect the light from the fiber optical fiber, 1.7. Though the overall shape of the reflective surface may not be flat, particularly when deformed by the piezo electric element, 1.2, the part of the surface from which the light is reflected is effectively flat due to the comparatively small area of the reflective surface, 1.12, involved.

Speech from a diver is directed towards the second piezo electric element, 1.3, as shown by arrow A. The speech causes variations in the air pressure. The piezo electric, 1.3, element generates an electric potential which is a function of the variation in air pressure. The electric potential generated by the second piezo electric element, 1.3, is applied via the interconnecting wires, 1.4, 1.5, to the first piezo electric element, 1.2. The applied potential causes the first piezo electric element, 1.2, to deform, thereby moving the reflective surface, 1.12, which results in a change in the distance between the reflective surface, 1.12, and the end, 1.9, of the optical fiber, 1.7.

Figure 2A:
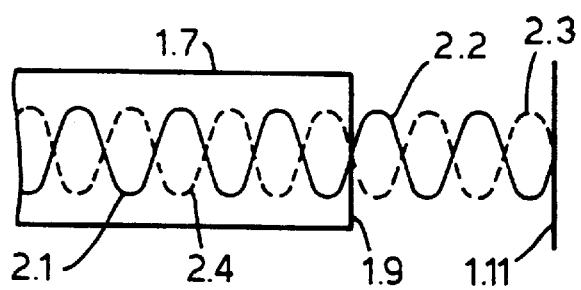
FIGS. 2A and 2B show a diagrammatical representation of how the acousto-optic modulator operates.
Figure 2B:
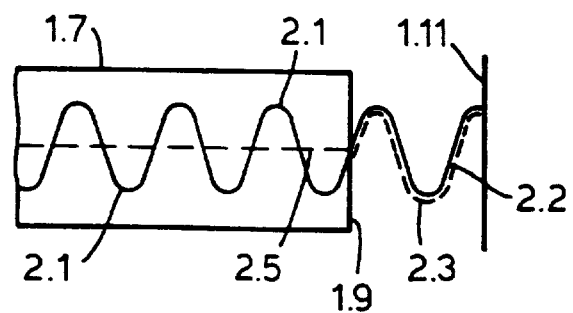

FIGS. 2A and 2B show an enlarged view of the end of the optical fiber and the reflective surface, 1.12, with a diagrmmatical representation of the light waves, 2.1, 2.2, 2.3, 2.4, 2.5, super imposed.

Light, 2.1, from a monochromatic light source (not shown) is fed down the optical fiber, 1.7, to the acousto-optic modulator. Part of the light, 2.1, is reflected back along the fiber optic cable, 1.7, at the interface, 1.9. The remainder, 2.2, shines onto the reflective surfaces, 1.12, connected to the first piezo electric element, 1.2. The light, 2.2, emitted from the optical fiber, 1.7 is narrowly divergent, forming an approximate parallel beam. The position of the reflective surface, 1.12, is moving thereby altering the distance which the light, 2.2, emitted from the optical fiber, 1.7, has to travel. This in turn effects the phase of the light reflected off the reflective surface, 1.12, at the interface, 1.9, relative to light, 2.3, reflected at the interface.

FIG. 2A shows the reflective surface, 1.12, in a position where the light, 2.3, reflected of the reflective surface, 1.12, in in phase at the interface, 1.9, with the light reflected off the interface, 1.9. Because they are both in phase, they constructively interfere forming a single reflective light signal, 2.4, which returns along the fiber optic cable, 1.7. FIG. 2B shows the reflective surface in a position in a position where the light, 2.3, reflected off the reflective surface, 1.12, is 180 degrees out of phase at the interface, 1.9, with the light reflected off the interface, 1.9. Because they are out of phase, they destructively interfere resulting in little or no signal, 2.5, being returned along the fiber optic cable, 1.7.

The amounts of constructive or destructive interference are dependant on the phase difference between the light reflected off the interface, 1.9, and the light, 2.3, reflected off the reflective surface which in turn is dependent on the position of the reflective surface, 1.12, relative to the interface, 1.9.

The amounts of constructive and destructive interference are also dependent on the proportion of light reflected at the interface, 1.9, versus the amount reflected off the reflective surface, 1.12. However, this remains constant regardless of the position of the reflective surface, 1.12.

All of the components are encapsulated in a hard plastic, 1.13, for durability.

The first piezo electric element, 1.2, can be replaced by a liquid crystal element. Alternatively, the first piezo electric element, 1.2, can be replaced by luminescent silicon, whose light output is dependent on the wavelength or intensity of light shone on the surface and the electrical charge across the silicon, the electrical charge being provided by the converter means.

I claim:

1. A passive acousto-optic modulator for the modulation of a light beam as a function of a variation in air pressure comprising a beam splitter arranged relative to the beam so as to produce a signal beam and reference beam;

a light modulator which modulates the signal beam, the light modulator comprising an approximately flat optically reflective surface capable of movement, the reflective surface being located in a position which, at rest, is a predetermined distance from the beam splitter and is approximately parallel to and facing the beam splitter and a piezo electric element, the piezo electric element being connected to the reflective surface in such a way that when an electric potential is applied across the piezo electric element, it causes the reflective surface to move; and conversion means to convert variations in air pressure into corresponding variations in a signal for driving the light modulator;

the arrangement being such that the modulated signal beam is combined with the reference beam to produce constructive or destructive interference.

2. A passive acousto-optic modulator as claimed in claim 1 wherein the beam splitter transmits the signal beam and reflects the reference beam.

3. A passive acousto-optic modulator as claimed in claim 1 wherein the beam splitter is used to combine the modulated signal beam and the reference beam.

4. A passive acousto-optic modulator as claimed in claim 1 wherein the beam splitter comprises a flat interface located between two optically transparent media, the interface being arranged relative to the light modulator such that when the light beam travels through the interface, some of the light beam is able to pass through the interface to form the signal beam, the rest of the light beam being reflected back off the interface to form the reflected reference beam, the modulated signal beam passing back through the interface constructively or destructively interfering with the reflected reference beam at the interface.

5. A passive acousto-optic modulator as claimed in claim 4 wherein the light beam travels towards the interface in a direction which is perpendicular to the interface so that the direction of the signal beam and the reference beam are perpendicular to the interface.

6. A passive acousto-optic modulator as claimed in claim 5 wherein the modulated signal beam passes through the interface in a direction which is perpendicular to the interface.

7. A passive acousto-optic modulator as claimed in claim 4 wherein the interface is formed by the end of an optical fiber being surrounded by a gaseous or liquid medium.

8. A passive acousto-optic modulator as claimed in claim 7 wherein the end of the optical fiber is located within air.

9. A passive acousto-optic modulator as claimed in claim 1 wherein the light modulator and the conversion means are located remotely from each other, additional means being provided to enable the signal generated by the conversion means to be transmitted to the light modulator.

10. A passive acousto-optic modulator as claimed in claim 9 wherein the signal generated by the conversion means to drive the optical modulator is an electrical signal, the additional means to enable the the signal to be transmitted being electrical wires.

11. A passive acousto-optic modulator as claimed in claim 1 wherein the signal beam is a monochromatic light signal.

12. A passive acousto-optic modulator as claimed in claim 1 wherein the the movement of the reflective surface is linear and in a direction approximately perpendicular to the beam splitter, the amount of movement being a function of the signal generated by the conversion means.

13. A passive acousto-optic modulator as claimed in claim 12 wherein said light is non chromatic and the amount of movement of the reflective surface is less than the length of one wavelength of the light being used.

14. A passive acousto-optic modulator as claimed in claim 12 wherein the piezo electric element comprises piezo electric material attached to a metal disk, the disk being securely mounted around it's rim, the reflective surface being attached to the metal disk thereby being connected to the piezo electric material.

15. A passive acousto-optic modulator as claimed in claim 1 wherein the conversion means comprises a piezo electric element which converts the variations in the air pressure into an electrical signal, the variations in the electrical potential being a function of the variation of the air pressure.

16. A passive acousto-optic modulator as claimed in claim 1 wherein the piezo electric element comprises a piezo-ceramic transducer.

17. A passive acousto-optic modulator as claimed in claim 4 wherein the light emitted from the interface is a narrowly divergent light beam.

18. A passive acousto-optic modulator as claimed in claim 17 wherein the light emitted from the interface is a parallel beam of light.

* * * * *